(No Model.)  3 Sheets—Sheet 1.

A. SAUNDERS.
COMBINED PIPE CUTTING AND THREADING TOOL.

No. 380,937. Patented Apr. 10, 1888.

WITNESSES
John Becker
Charles H. Herbert

INVENTOR
Alexander Saunders
Per James A Whitney
Attorney.

(No Model.) 3 Sheets—Sheet 2.
A. SAUNDERS.
COMBINED PIPE CUTTING AND THREADING TOOL.
No. 380,937. Patented Apr. 10, 1888.
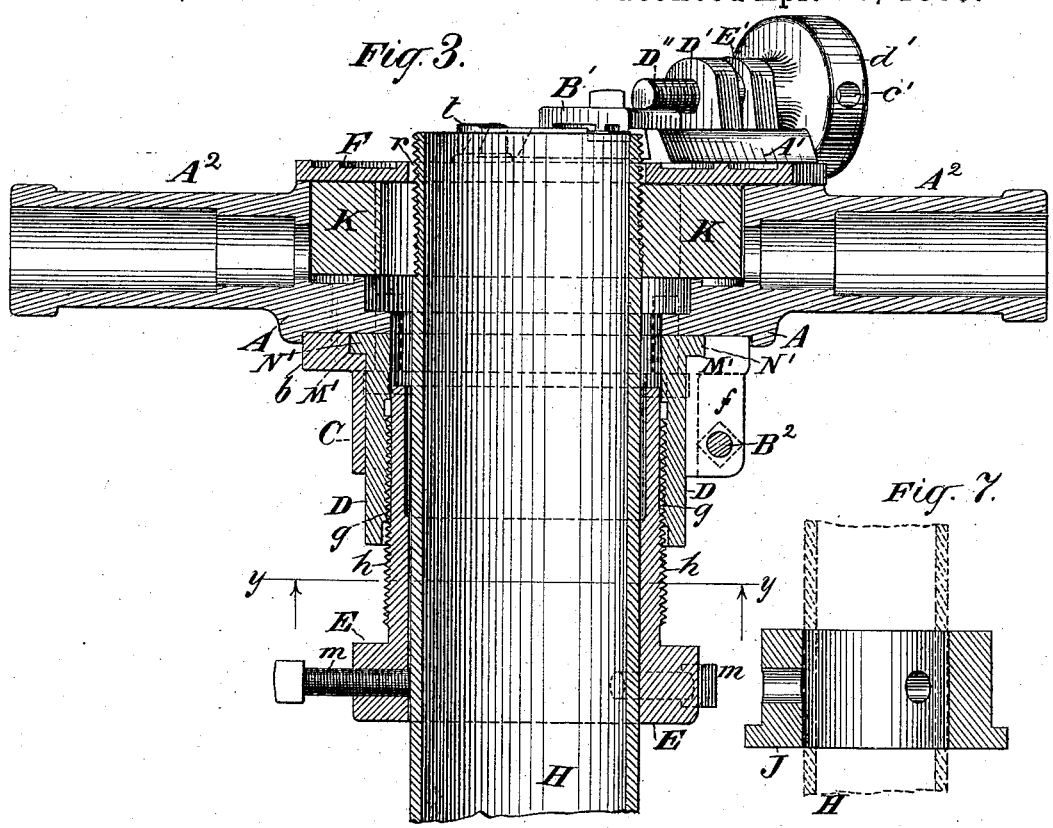
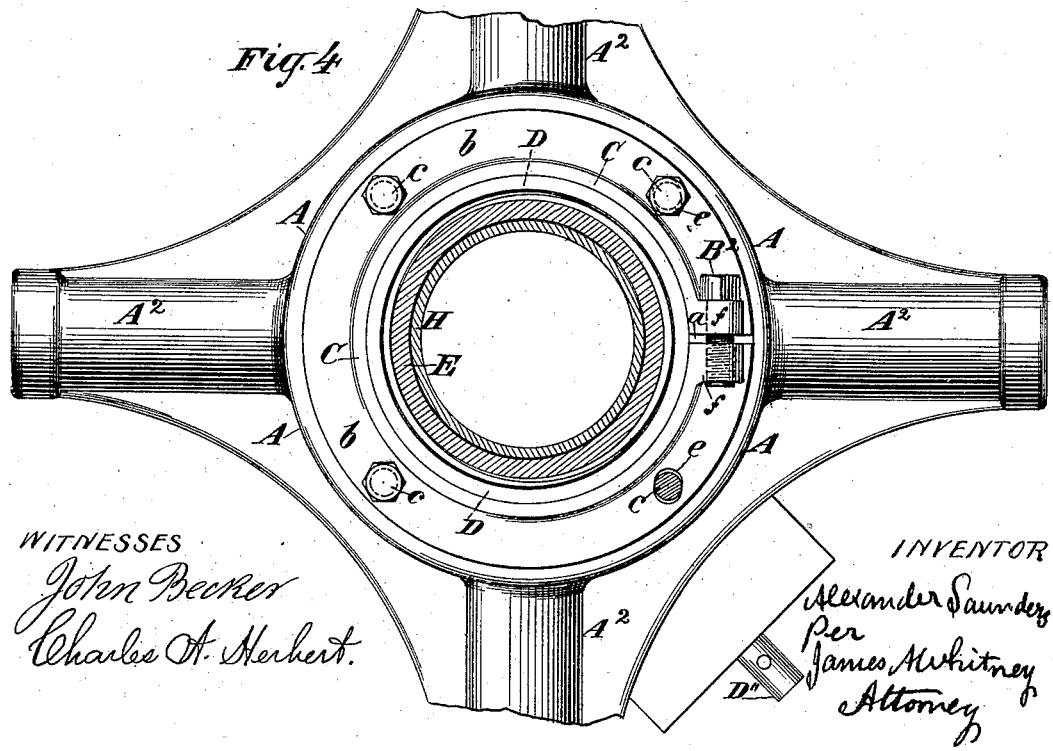
WITNESSES
John Becker
Charles A. Herbert.
INVENTOR
Alexander Saunders
per
James A. Whitney
Attorney (No Model.) 3 Sheets—Sheet 3.
A. SAUNDERS.
COMBINED PIPE CUTTING AND THREADING TOOL.
No. 380,937. Patented Apr. 10, 1888.
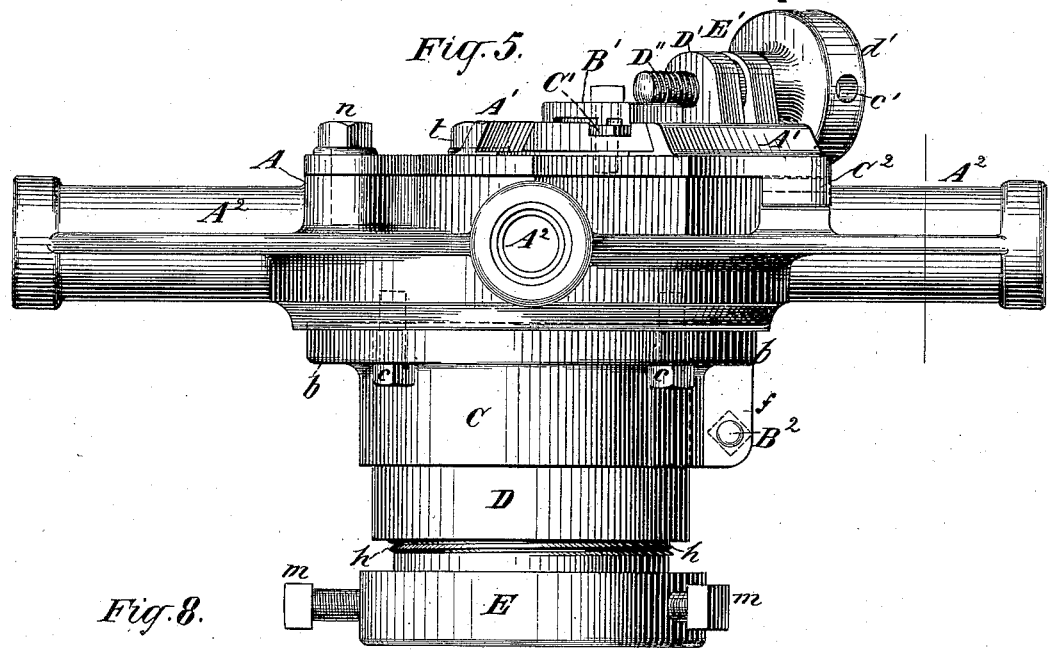
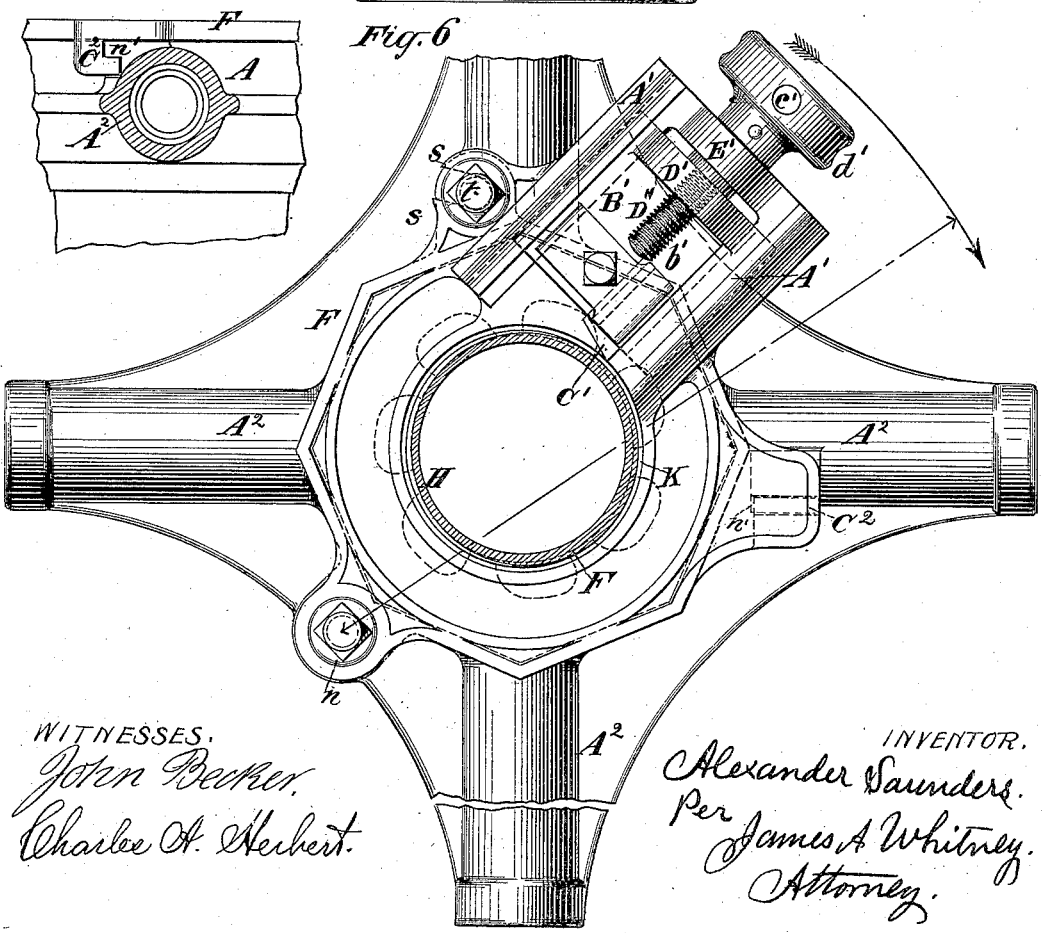
WITNESSES.
John Becker
Charles A. Herbert
INVENTOR.
Alexander Saunders.
Per James A. Whitney.
Attorney.

UNITED STATES PATENT OFFICE.

ALEXANDER SAUNDERS, OF YONKERS, NEW YORK.

COMBINED PIPE CUTTING AND THREADING TOOL.

SPECIFICATION forming part of Letters Patent No. 380,937, dated April 10, 1888.

Application filed November 28, 1887. Serial No. 256,275. (No model.)

*To all whom it may concern:*

Be it known that I, ALEXANDER SAUNDERS, a citizen of the United States, residing at Yonkers, in the county of Westchester and State of New York, have invented certain new and useful Improvements in Combined Pipe Cutting and Threading Machines; and I do hereby declare that the following is a full, clear, and exact description of the invention, which will enable others skilled in the art to which it appertains to make and use the same.

The object of this invention is to provide a machine which, by throwing into operation certain of its parts and throwing out of operation others of its parts, may be used at will for transversely severing or cutting pipes, tubes, &c., or for forming screw-threads externally upon the same.

To this end my said invention comprises certain novel means hereinafter fully set forth and particularized.

Figure 1:
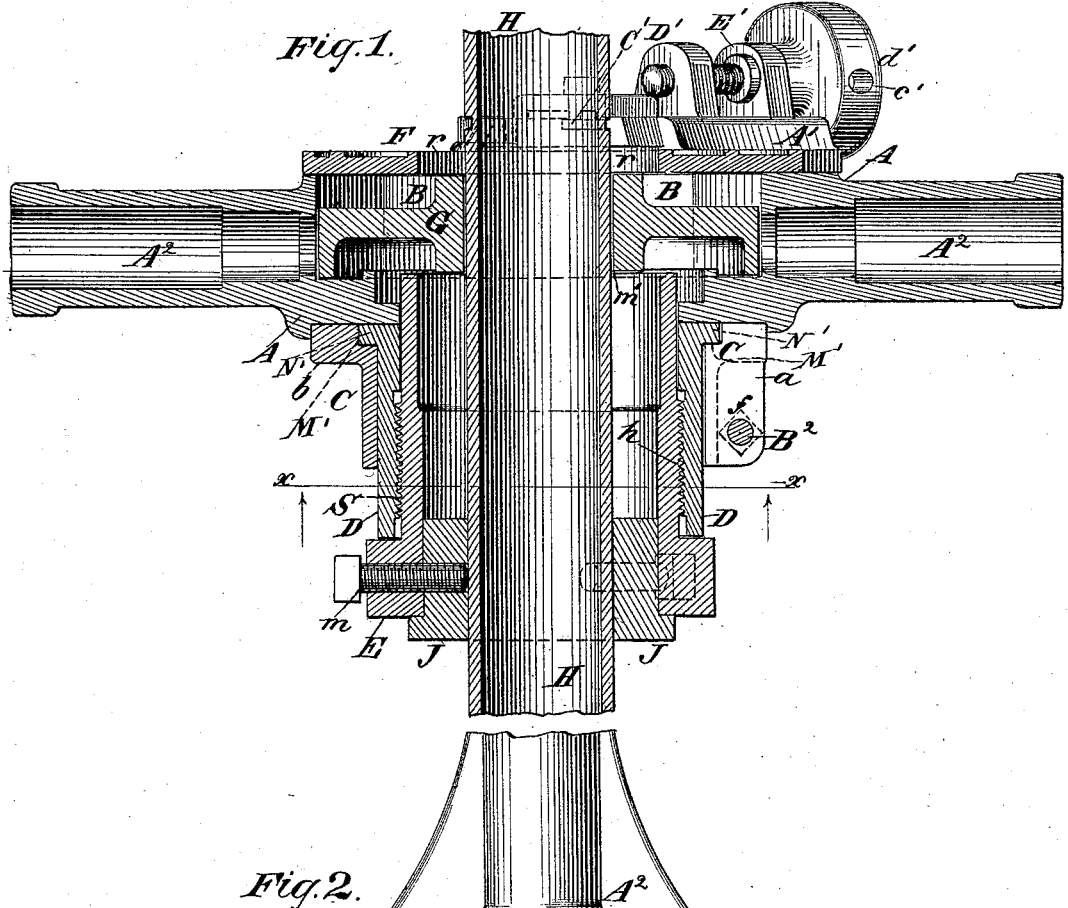
Figure 2:
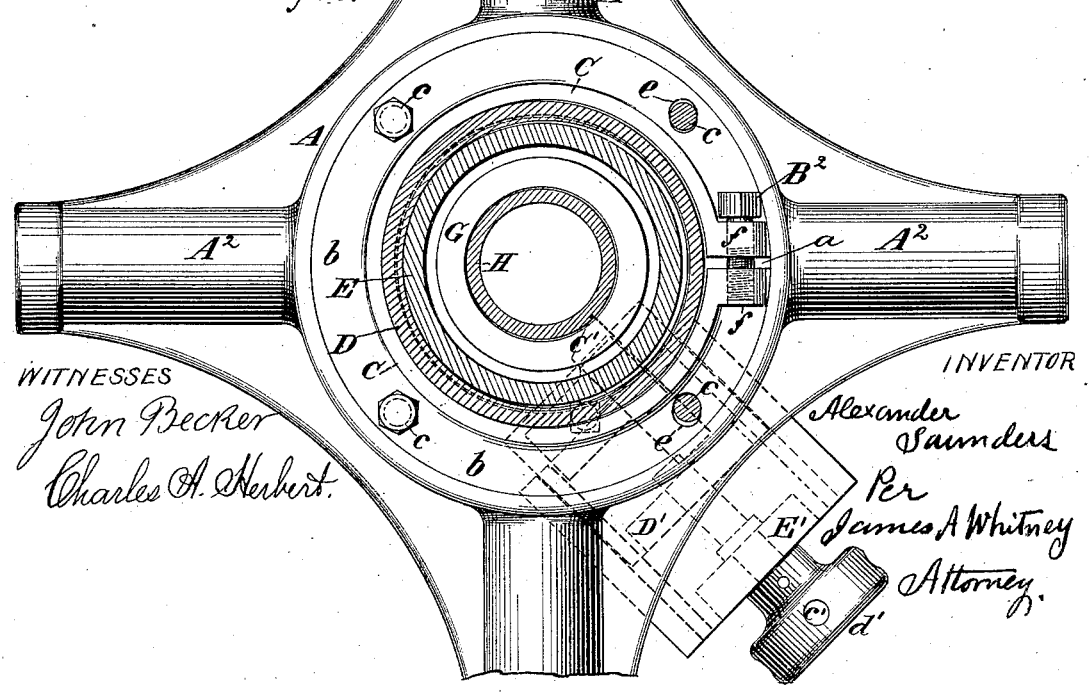

Figure 1 is a central longitudinal sectional view of an apparatus made according to my said invention and as arranged to cut or sever pipes, &c. Fig. 2 is a central transverse sectional view taken in the line $xx$ of Fig. 1. Fig. 3 is a longitudinal sectional view; Fig. 4, a transverse sectional view taken in the line $yy$ of Fig. 3; Fig. 5 a side view, and Fig. 6 a front or face view, of the said apparatus as arranged for cutting screw-threads upon pipes, &c. Figs. 7 and 8 are detail views of certain parts.

A is a shell provided with an internal chamber, B, which circumferentially is of polygonal form, or of such other shape as will insure that a screw-cutting die placed thereon will turn with the movement of the shell.

The shell A is provided with any desirable number of radial socket-arms, $A^2$, for the reception of levers, by which the apparatus may be operated when in use. At the inner side of this shell A is a cylindrical collar, C, which is split or longitudinally divided at one side, as shown more clearly at $a$ in Figs. 2, 4, and 5. This collar C has a flange, $b$, which, by means of set-screws $c$, is attached to the adjacent side or surface of the shell A, said set-screws passing through suitable holes, $e$, in said flange. The said holes $e$ in those parts of the flange adjacent to the split $a$ are elongated, and the collar is itself made elastic, so that on occasion it may spring outward loosely from the sleeve D, upon which it is placed. To permit this, the proper holes $e$ are somewhat elongated or slot-shaped. The ends of the collar C at the split $a$ are turned outward parallel with each other to form lugs $f$, to which is provided a set-screw or screw-bolt, $B^2$, by which the said lugs may be brought nearer together to clamp the collar upon the sleeve D, or farther apart to permit the collar to run loose upon said sleeve, according as the apparatus is to be used for screw-cutting upon or for severing the pipes, as hereinafter more fully explained.

The collar C has at its inner circumference and at its inner end a rabbet, M', and upon the corresponding outer circumference of the sleeve D is formed a surrounding flange, N', which fits into the rabbet M', aforesaid, of the collar C, and, resting upon the shoulder provided by the bottom of the rabbet, prevents the longitudinal withdrawal of the sleeve D and its dependencies from the collar C, and permits the requisite movement of all the parts in due relation with each other while remaining permanently in due relation with the others.

The sleeve D has an internal screw-thread, as shown at $g$, the pitch of which corresponds to that of the screw-thread to be formed upon the pipe. This screw-thread $g$ screws upon the external screw, $h$, of the cylindrical axle-shell E. The latter is provided with set-screws $m$, arranged in position radial to the axis of the axle-shell E.

To the front of the shell A is provided a movable front or cover, F. This cover may be pivoted at its edge to the corresponding circumference of the shell A, as at $n$. (See Fig. 6.) This cover F has an opening, $r$, which, when the cover is in place, is coincident with the bore or interior of the axle-shell E, as more clearly shown in Figs. 1 and 3. The cover F is provided with a slotted lug, $s$, which, when the cover is closed, straddles a set-screw, $t$, which works in a suitable nut in the shell A, the said slotted lug $s$ passing under the head of said set-screw, so that by turning the latter the said head binds snugly upon the lug and thus firmly holds the cover in its closed position. The retention of the cover in place is assisted by a lap or lip, $C^2$, provided at the edge thereof, and which, when the cover is closed, holds underneath a shoulder, $n'$, attached to the shell A, as shown in the detail view, Fig. 8. Provided upon the outer surface of the cover F, at one side thereof, are parallel guides A', in which works a sliding or adjustable head, B'. To this head, in any suitable manner, is attached a cutter or chisel, C'. The head B' is provided at its outer end with a nut, D', in which works the threaded end $b'$ of a screw, D'', which is journaled in a suitable bearing, E', at the outer end of the guides A', in such manner that by turning the screw D'' in one direction or the other the head B', and consequently the cutter C', may be moved inward or outward, as the case may be. The said screw may be turned by any suitable means—as, for example, by a rod or lever inserted in a socket, $c'$, attached to the head $d'$ of the said screw.

In order to use the apparatus for screw-cutting, there is placed in the chamber B of the shell A a false bearing, G, as shown in Fig. 1, the circumference of which should fit the internal circumference of said chamber, so that the said false bearing may rotate with the rotation of the shell A. The central circular orifice or opening, $m'$, of this false bearing corresponds in diameter to that of the pipe H to be cut or transversely severed. At the opposite end of the apparatus—that is to say, in the outer end of the axle-sleeve E—is inserted a second false bearing, J, which is provided with radial slots, through which may pass the screws $m$. The bore or orifice of this second false bearing, like that of the first, corresponds to the pipe H. When the pipe to be severed corresponds in diameter to the internal diameter of the axle-sleeve E, the second false bearing may be dispensed with.

When the apparatus is to be used for cutting or transversely severing pipe, the pipe to be cut is thrust through the apparatus, as illustrated in Figs. 1 and 2, with the place at which it is to be cut or severed brought opposite the cutter C'. The split collar C is loosened, so that instead of binding upon the sleeve D it runs free thereon. The said sleeve D is screwed downward or inward to its limit upon the axle-shell E, and the set screws $m$ are screwed inward until their inner ends bind upon the pipe H to an extent sufficient to prevent the false bearing J, the axle-shell E, and the sleeve D from turning upon or around the pipe H. This causes the sleeve D to form a journal or bearing for the split collar C concentric with the pipe H. The cutter or chisel C is then fed inward toward the pipe simultaneous with the rotation of the shell A and split collar C, and consequently of said cutter, around the pipe, this simultaneous rotation of the shell A and inward feeding of the cutter being continued until the operation of cutting is completed.

When the apparatus is to be used for screw-cutting, the false bearing G is replaced by a suitable screw-cutting die, K, as represented in Figs. 3, 4, and 5, a false bearing, J, in the axle-sleeve E being used or not, according as the diameter of the pipe H to be threaded is the same or less than that of the axle-sleeve E. The latter is clamped to the pipe in the same manner as when the pipe H is to be severed. The split collar C is tightened upon the sleeve D, so that instead of turning thereon it will be governed by the movement thereof. The cutter C' is moved outward away from the pipe, so that the rotation of the said cutter with the shell A shall not affect the pipe. The shell A being then rotated, the screw-cutting die K acts upon the exterior of the pipe to cut the thread thereon, the requisite feed being given to the pipe by the action of the screw-thread $h$ of the axle-sleeve E upon the thread $g$ of the sleeve D. The cover F serves the same purpose with regard to the screw-cutting die that it does with reference to the false bearing G—i. e., that of keeping the part in place and retaining the same in the proper position for use.

What I claim as my invention is—

1. The combination, with the shell A, of the sleeve D, constructed with the flange N', the split collar C, constructed with the rabbet M', and devices for tightening and loosening the said split collar upon the said sleeve, substantially as and for the purpose herein set forth.

2. The combination of the split collar C, constructed with the rabbet M', slotted flange $b$, and lugs $f$, the internally-threaded sleeve D, constructed with the flange N', the externally-threaded axle-sleeve E, the shell A, cover F, having guides A', sliding head B', screw D'', cutter C', and the set-screws $m$ and B², all substantially as and for the purpose herein set forth.

ALEXANDER SAUNDERS.

Witnesses:
CHARLES A. HERBERT,
ISIDORE A. LEVY.